July 11, 1933.                H. T. WOOLSON                1,918,167
                       TRANSMISSION CASE CONSTRUCTION
                         Filed Sept. 10, 1930        2 Sheets-Sheet 1

INVENTOR
HARRY T. WOOLSON
BY
ATTORNEY

July 11, 1933.  H. T. WOOLSON  1,918,167

TRANSMISSION CASE CONSTRUCTION

Filed Sept. 10, 1930  2 Sheets-Sheet 2

INVENTOR
HARRY T. WOOLSON.
BY
ATTORNEY

Patented July 11, 1933

1,918,167

UNITED STATES PATENT OFFICE

HARRY T. WOOLSON, OF DETROIT, MICHIGAN, ASSIGNOR TO CHRYSLER CORPORATION, OF DETROIT, MICHIGAN, A CORPORATION OF DELAWARE

TRANSMISSION CASE CONSTRUCTION

Application filed September 10, 1930. Serial No. 480,989.

This invention relates to an improved transmission case construction.

In transmission cases of the type used for housing four speed transmission mechanism it is necessary to provide a comparatively large machined seat of cylindrical form for receiving an internal gear sleeve which requires accurate placing in the housing in a concentric relation with respect to the axes of the driving and driven shafts. Heretofore, housings of this type have been made in two or more parts and the seat for the ring gear has been machined before assembling of the parts. With this form, difficulty has been encountered in properly machining and assembling the parts so as to bring the axes of the bearings of the driving and driven shafts and the seat for the internal gear sleeve into alignment. In practice, each part is set up for machining separately and as a result the limits within which the machining operations are performed are not as close as can be obtained when only a single set up of the work is required.

The main objects of this invention are to provide a one piece transmission casing which is so constructed as to permit machining of an internal seat for supporting a ring gear sleeve of the type used in four speed vehicle transmissions; to provide a casing of this kind in which the gears of the transmission may be assembled from an end of the housing without turning or twisting them from their normal perpendicular relation to the axes of the driving and driven shafts; to provide an opening in the end of a casing through which a solid reamer of sufficient size to machine a cylindrical bore for the ring gear sleeve may be inserted; to provide a closure for this opening having a bearing for supporting the driven shaft of the mechanism; to provide a cylindrical pilot on the closure for bringing the bearing of the driven shaft into concentric alignment with the bearing of the driving shaft and with the seat of the internal ring gear; and to provide a transmission case construction in which the seats for the ring gear sleeve and driven shaft bearing pilot may be machined during a single setting of the casing so as to permit alignment of the internal toothed ring gear and the driven shaft bearing within very close limits.

A further object of this invention is to provide means on a rotatable member for securing a ball race thereon against axial movement.

An illustrative embodiment of my invention is shown in the accompanying drawings, in which.

Figure 1:
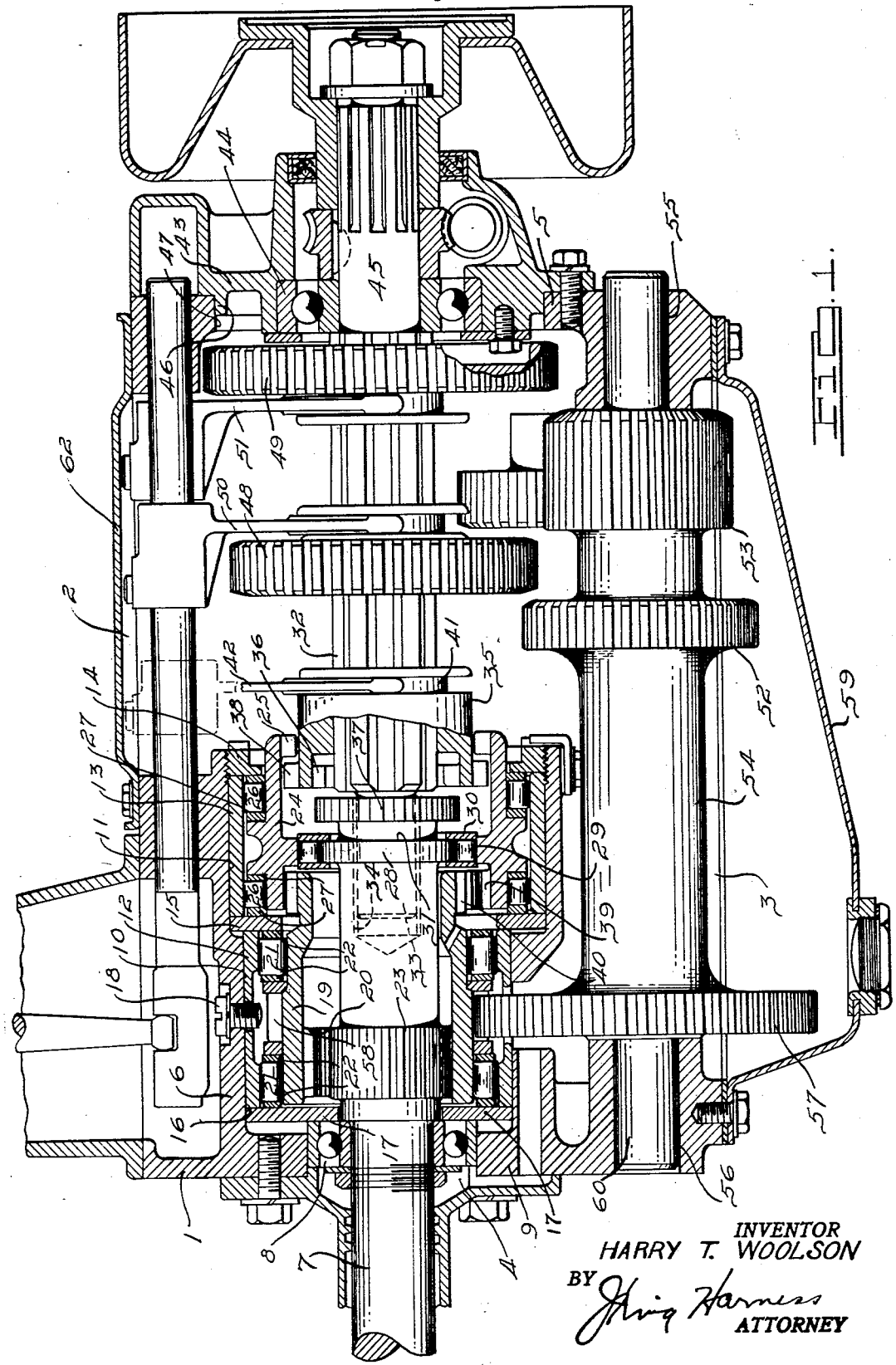
Fig. 1 is a vertical section of a vehicle transmission embodying my invention.
Figure 2:
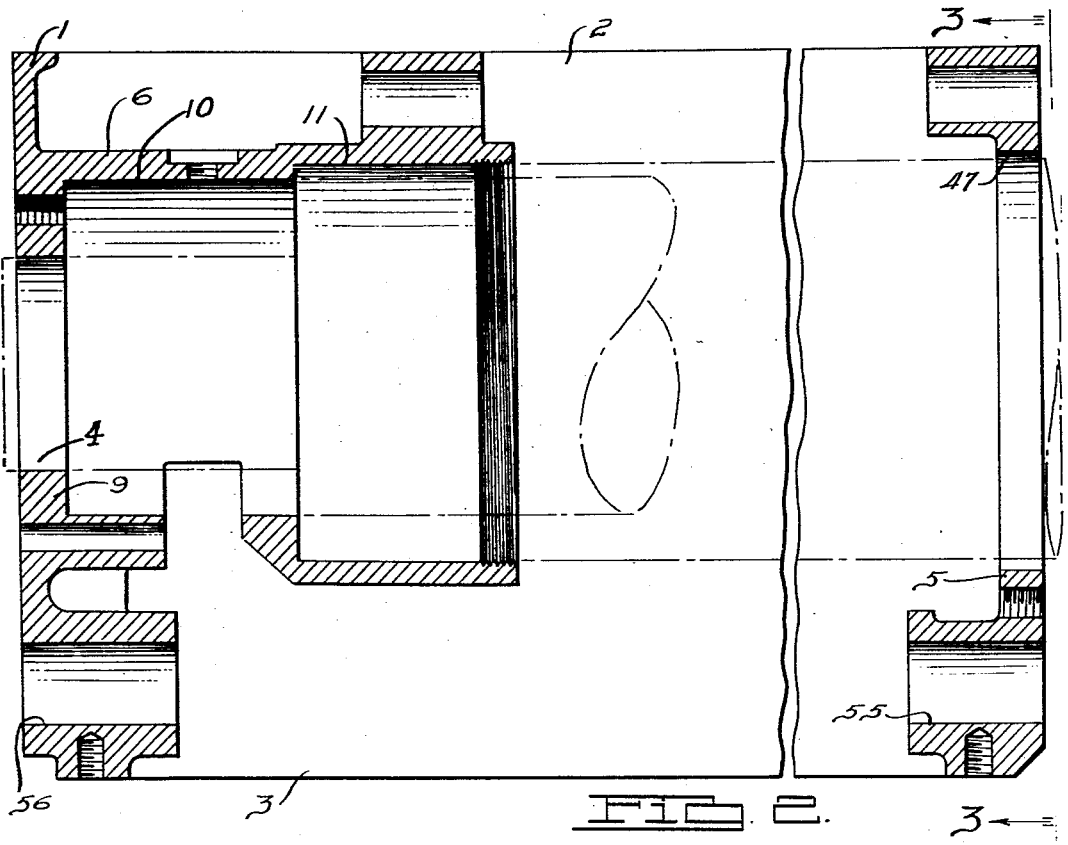
Fig. 2 is an enlarged fragmentary section showing the seats for the ring gear sleeve and driven shaft bearing pilot in detail.
Figure 3:
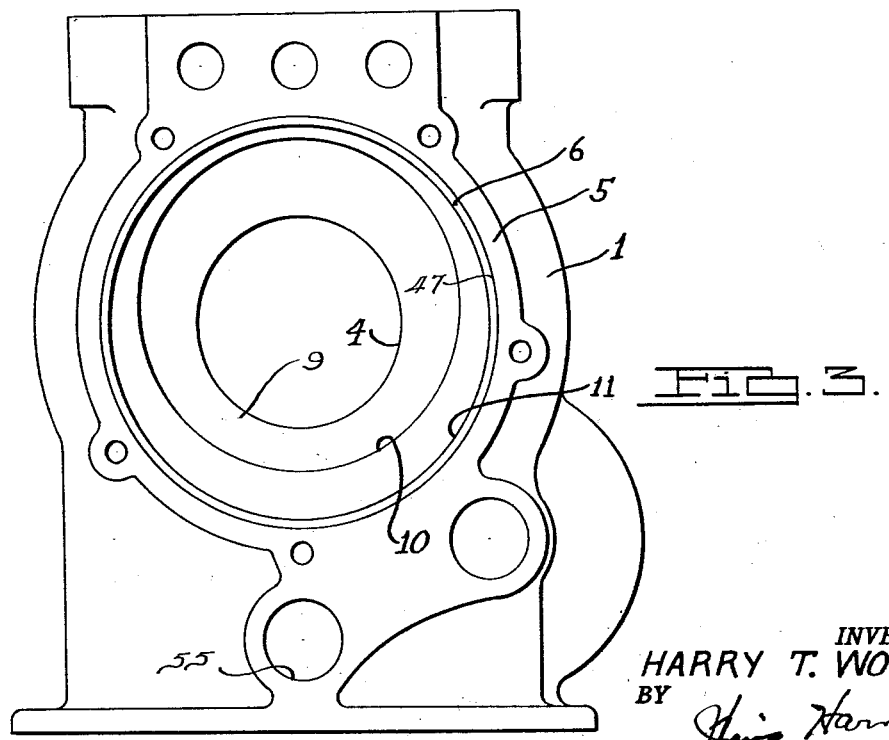
Fig. 3 is an end elevation of the casing as viewed from line 3—3 of Fig. 2.

In the form shown, the transmission casing includes an integral body part 1 having a top opening 2, a bottom opening 3, a restricted opening 4 in its left end and a substantially open right end 5. Formed in the body part 1 of the casing is a substantially tubular support 6 which communicates with the end opening 4 thereof and is located at the left end of the casing. A driving shaft 7 extends through the opening 4 of the housing and into the tubular support 6 in which it is substantially concentrically located. This shaft is journaled in a bearing member 8 which is seated in the opening 4 of the left end wall 9 of the casing. The interior of the support 6 is provided with relatively offset cylindrical seats 10 and 11 in which bearing sleeves 12 and 13 respectively are received. These seats have machine surfaces by which the sleeves are accurately located in predetermined locations with respect to the driving shaft 7. The sleeves 12 and 13 are held against movement axially of the driving shaft by a ring member 14 which is threaded in the right extremity of the support 6. The member 14 bears upon the innermost sleeve 13 which in turn abuts against a ring 15, the ring being located between the adjacent edges of the sleeves 12 and 13. The outer edge 16 of the sleeve 12 engages a ring 17 which is located adjacent to the left side face of the bearing 8. A screw 18 extends through registering apertures in the support 6 and sleeve 12 forming a further obstruction to outward movement of the sleeve 12.

The inner periphery or seat 10 in which the sleeve 12 is received is eccentric with respect to the driving shaft 7 and it therefore positions the sleeve 12 in an eccentric relation to the driving shaft. Located in the sleeve 12 is a rotatable tubular member or sleeve 19 on the inner periphery of which are formed gear teeth 20. The rotatable sleeve 19 is supported in spaced relation to the bearing sleeve 12 by a pair of bearing members, each including a plurality of rollers 21 and a pair of retaining rings 22. The sleeve 12 and bearing members, hold the rotatable sleeve 19 in an eccentric relation with respect to the driving shaft 7 causing the teeth 20 of the sleeve 19 to mesh with teeth 23 formed on the shaft 7.

A sleeve 24 having clutch teeth 25 on the outer edge portions of its inner periphery is rotatably supported in the bearing sleeve 13 of the left end of the support 6 by a pair of bearing members each including a plurality of rollers 26 which are secured in an annular arrangement by retaining rings 27. The toothed sleeve 24 is also rotatably supported on an integral collar 28 formed on the driving shaft 7 by a bearing member which includes a plurality of rollers 29 that are held in an annular arrangement by retaining rings 30. The rings 30 extend inwardly towards the shaft 7 embracing the side faces 31 of the collar 28 so as to secure the bearing member against axial movement relative to the shaft 7. These retaining rings are preferably formed in two sections so as to permit convenient assembling of the structure. A driven shaft 32 having a splined intermediate portion and a reduced end portion 33 is located in the casing, the end portion 33 of the driven shaft 32 being journaled in an aperture 34 formed in the right end of the driving shaft 7. Splined on the intermediate portion of the driven shaft 32 is a shiftable clutch member 35 having internal teeth 36 which are adapted to mesh with the teeth of a clutch member 37 on the inner end of the driving shaft 7. The clutch member 35 also has external teeth 38 which are adapted to mesh with the internal teeth 25 of the rotatable sleeve 24, the latter sleeve being provided at its other end with internal teeth 39 which mesh with external teeth 40 on the eccentrically located rotatable sleeve 19.

The shiftable member 35 has a groove 41 in its periphery in which a shifter fork 42 is engaged, the fork being carried by a gear shift shaft which is slidably mounted in the body part 1 of the casing at the upper extremity thereof. When the internal teeth 36 of the gear 35 are in mesh with the teeth of the pinion 37 of the driving shaft 7 a direct drive is provided between the driving and driven shafts, but when the teeth 38 of the clutch member 35 are in mesh with the teeth 25 of the sleeve 24, the drive is through the eccentric sleeve 19 and the concentric sleeve 24 thereby producing a lower speed drive than that formed during the direct driving operation of the shafts.

The right hand open end of the body part 1 of the casing is provided with a closure 43 in which a bearing 44 is mounted for rotatably supporting the right end 45 of the driven shaft 32. The closure 43 has a pilot flange 46 which is received by a cylindrical seat 47 formed in the end wall of the body part 1 of the casing.

In order to properly locate the bearing member 44 of the driven shaft 32 in concentric alignment with the sleeve 13 which supports the rotatable sleeve or ring gear 24, it is necessary that the seats 11 and 47, on which the sleeve 13 and pilot 46 respectively are received, be concentric with each other. This is conveniently accomplished during a single machining set up of the transmission casing by first inserting a solid reamer through the opening in the end 5 of the body part which is slightly larger in diameter than the inner diameter of the seat 11 required. This construction permits the inner peripheries of the support 6 to be bored exactly to a specified diameter. The eccentric seat 10 in the left end of the support 6 may also be formed by a boring operation during which a reamer is inserted through the opening in the right end 5 of the case. While the casing is held in the same fixed position upon a machine bed, the seat 47 in the end wall 5 of the body part 1 may also be formed by a reaming operation. In this manner, the seats 11 and 47 are formed by boring during a single set up of the work and therefore they may be accurately formed so as to be concentric within very close limits by a solid reamer.

Splined on the intermediate part of the driven shaft 32 is a second speed gear 48 and a low speed gear 49 which are provided with forks 50 and 51 respectively by means of which they may be selectively moved into meshed relation with corresponding pinions 52 and 53 respectively, integrally formed on a countershaft 54 which has a shaft 60 mounted in apertures 55 and 56 in the end wall of the casing. The countershaft 54 has an external gear 57 which is permanently meshed with teeth 58 on the eccentric sleeve or ring gear 19, the countershaft and shiftable gears being of a construction of conventional transmission design.

In assembling the transmission, the driving shaft 7 is inserted in the casing through the open right end thereof and extended through the opening 4 in the left end of the casing, the bearing member 8 being moved into place from the left end of the driving shaft. Then the sleeves 12 and 13 and the bearing members journaled therein are inserted through the opening in the right end of the casing in the order in which they appear in Fig. 1. The countershaft 54 is inserted into the casing through the bottom opening 3 thereof which is normally closed by a pan 59 and the shaft 60 which extends through the countershaft 54 may be extended into the apertures 55 and 56 from the left end of the casing as viewed in Fig. 1. The shiftable gears 35, 48 and 49 may be introduced into the transmission case through the top opening 2 thereof which is normally closed by a cover 62, the gears being held in place while the driven shaft 32 is inserted through the opening in the right end of the casing and through the passage in the centers of the gears.

With this construction the internal machining required in providing concentric seats for the driven shaft bearing pilot and the internal toothed ring gear sleeve may be conveniently formed in a one piece transmission casing, thereby obviating the difficulty of forming these machine surfaces during separate set ups on separate parts of a casing and thereafter uniting the parts in such a manner as to bring the machine surfaces into concentric alignment with each other.

Although but one specific embodiment of this invention has herein been disclosed and described, it will be understood that various changes including the size, shape and arrangement of parts may be made without departing from the spirit of my invention and it is not my intention to limit its scope other than by the terms of the appended claim.

I claim:

A transmission gear casing comprising an integral one piece body portion having a substantially open end and an opposite end wall, an inwardly extending flange having a cylindrical periphery at the open end of said body portion, and an internal tubular bearing support extending inwardly from said end wall formed integral with said body portion and having adjacent eccentric bores, each for receiving a bearing respectively, the bore adjacent the end wall being of smaller diameter than the other bore, both of said bores being smaller than the inner diameter of the periphery of said flange and said bores and periphery being arranged so as to be available for machining during a single setup by extending a reamer through said open end.

HARRY T. WOOLSON.